ELECTRONIC COMMUTATOR

Filed Jan. 25, 1966 2 Sheets-Sheet 1

Arthur W. Ellis Jr.
Albert A. Black,
INVENTORS.

BY Harry M. Saragovitz
Edward J. Kelly
Herbert Berl
Jack H. Voigt

Arthur W. Ellis Jr.
Albert A. Black,
INVENTORS.
Harry M. Saragovitz
BY Edward J. Kelly
Herbert Berl
Jack H. Voigt

United States Patent Office 3,411,136
Patented Nov. 12, 1968

3,411,136

ELECTRONIC COMMUTATOR

Arthur W. Ellis, Jr., Templeton, and Albert A. Black, Cochituate, Mass., assignors, by mesne assignments, to the United States of America as represented by the Secretary of the Army

Filed Jan. 25, 1966, Ser. No. 522,997
10 Claims. (Cl. 340—166)

ABSTRACT OF THE DISCLOSURE

An electronic commutator which commutates sequentially a large number of high impedance inputs over a closely controlled period of time measured in micro-seconds. A hold time is provided at the end of each complete readout of the matrix. A hold time switch signal is fed to a monostable multivibrator that in turn biases the input off for a given time constant.

This invention relates generally to an electronic commutator and more specifically to an electronic commutator which commutates sequentially a large number of high impedance inputs.

For commutating a large number of signals in radar equipment, there is a need for a commutator which can handle a large number of inputs with great speed and present a very high input impedance. Therefore we have developed an electronic commutator which has no moving parts and for the particular application for which this invention was made can commutate 99 inputs in approximately 2,200 micro-seconds.

It is therefore an object of this invention to provide an electronic commutator which has a very high input impedance.

Another object of this invention is to provide an electronic commutator which will commutate a large number of input signals in the order of micro-seconds.

Still further, an object of this invention is to provide an electronic commutator with the capability of commutating D.C. inputs of 3- to 5-volt level with less than 1 db total variation of output for a large number of inputs.

Other objects and many of the attendant advantages of this invention will be readily appreciated as the same becomes better understood by reference to the following detailed description considered in connection with the accompanying drawing in which like reference numerals designate like parts throughout the figures thereof and wherein.

Figure 1:
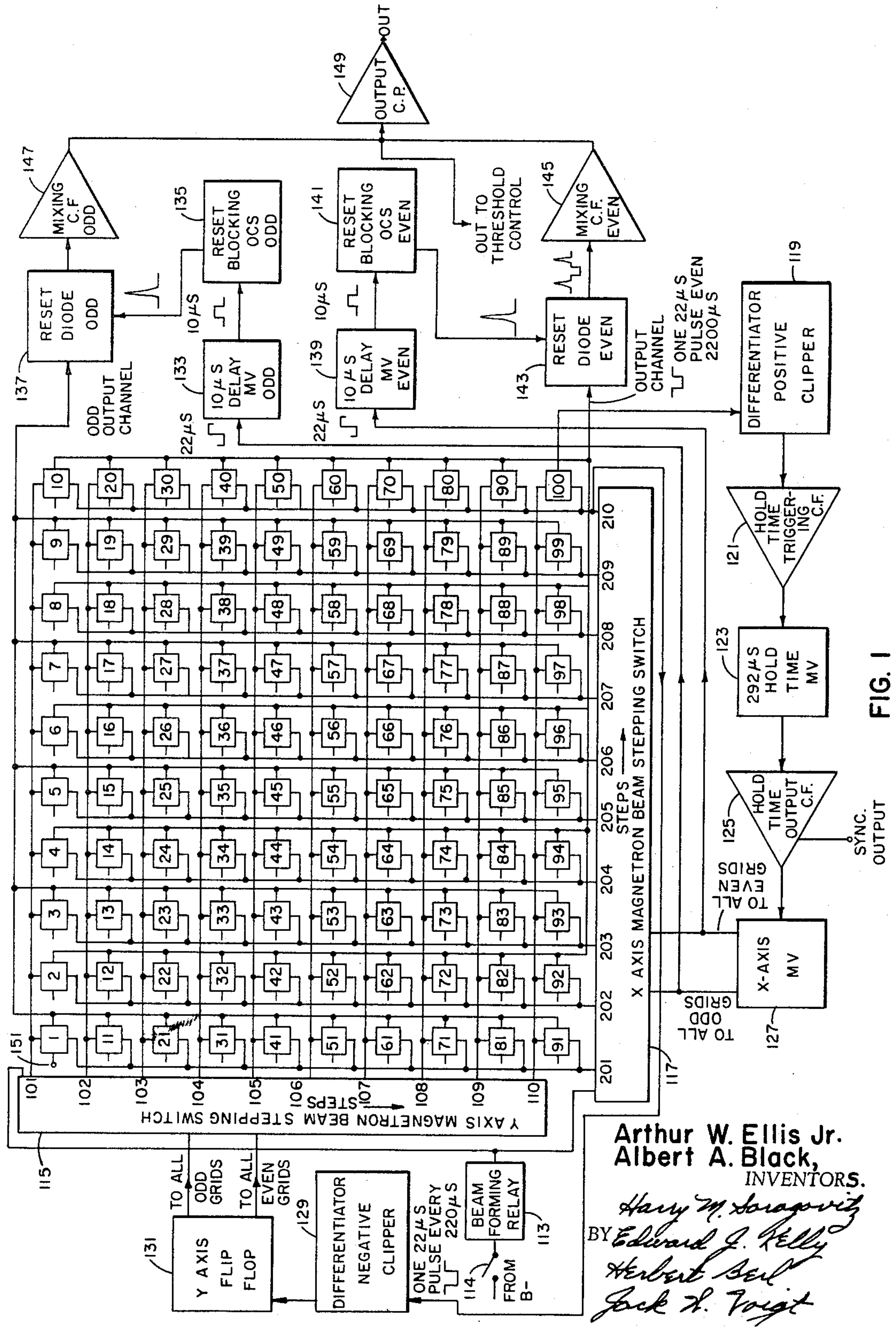
FIGURE 1 is a block diagram representation according to the present invention.

Referring now to FIGURE 1 there is shown an electronic commutator according to the present invention capable of commutating 99 inputs with a scan time of 22 micro-seconds per position. This particular embodiment is used for explanation only and it is quite feasible to increase the number of positions or the scan rate or both.

The commutator may be broken down into six functional parts: switching-pulse generators consisting of magnetron beam stepping switches 115 and 117; synchronizing circuits consisting of differentiator and positive clipper 119, multivibrator 127, differentiator and negative clipper 129, and flip-flop 131; holding circuits 121, 123, and 125, diode switching matrix having positions 1 thru

100 resetting circuits 133 thru 143, and mixing and output circuits 145 thru 149. The switching-pulse generators 115 and 117 are magnetron beam step switching tubes (FIGURE 2) each having ten positions. Each position consists of a target, a spade, and a grid, mounted radially about a central cathode. An axial magnetic field is provided by a cylindrical magnet permanently attached to a glass envelope (not shown). The beam must be formed initially by lowering the potential between a spade and the cathode. In the system under discussion, the electron beam is formed automatically by beam forming relay 113 which has an output connected to the spades of positions 101 and 102 of tubes 115 and 117 respectively. A negative supply voltage is connected to an input of relay 113 through a switch 114. The sequential switching of the magnetron beam tubes 115 and 117 is accomplished in the grid circuits. In each position the beam is affected only by the individual grid with which it is associated. The grids are connected in two groups, the odd number grids in one group and the even number grids in the other. The grids are connected in push-pull fashion from a 44 micro-second X-axis multivibrator 127 in the case of the X axis magnetron beam tube 117 and a flip-flop from a Y axis flip-flop 131 in the case of the Y axis magnetron beam tube 115.

The targets (FIGURE 2) are the output elements of tubes 115 and 117 and are normally at ground potential. As the electron beam is swept through each position, the target associated with that position is driven negative, thus giving an output in the form of a negative pulse of approximately −60 volts amplitude and a rise time in the order of 0.2 micro-second. The length of the output pulses in the case of the X axis tube 115 is 22 micro-seconds, one pulse per half cycle of the 44 micro-second multivibrator 127, and in the Y axis tube 117, 220 micro-seconds, one pulse per total sweep of tube 117.

An appropriate system of pulses must be established in order to step tubes 115 and 117 in the proper sequence. This is accomplished in the following manner:

The pulses for tube 117 are obtained from multivibrator 127 which has one output connected to the odd numbered grids of tube 117 and a second output connected to all even numbered grids of tube 117. Multivibrator 127 is a free running multivibrator with a period of 44 micro-seconds. As the output of multivibrator 127 is connected to the grids of tube 117 in push-pull, tube 117 will step one position for each half cycle of the multivibrator, or one position each 22 micro-seconds.

The Y axis tube 115 obtains its pulses from the Y axis flip-flop 131 which has two outputs connected to tube 115 in the same manner as multivibrator 127 is connected to tube 117. This bistable circuit is in turn connected to the output of a differentiator clipper 129 which has an input connected to the output of the number ten position of tube 117.

As the X axis tube 117 steps through its number ten position, a 22-micro-second negative pulse is produced. This pulse is pased on to the matrix and also out to differentiator negative clipper 129. The differentiated wave form with the negative portion removed is passed on to trigger flip-flop 131, the positive portion of the wave representing the trailing edge of the X axis pulse. In this manner the Y axis tube 115 is stepped one position for each ten positions of the X axis tube 117.

In the present circuit it is required that a 292-micro-second hold time be provided at the end of each complete readout of the matrix. Therefore, position 100 of the matrix is used as a hold time switch. As the matrix is scanned through this position a negative pulse is produced. This pulse is differentiated and then passed through a positive clipper by circuit 119, which is connected to the output of switch 100. The resulting pulse, corresponding in time to the leading edge of the input pulse, passes through a hold time triggering cathode follower 121 and then to the grid of the conducting tube of a hold time multivibrator 123. This circuit is monostable, producing a negative pulse 292 micro-seconds long each time it is triggered. The 292-micro-second pulse is passed through a hold time output cathode follower 125 to the X axis multivibrator 127 where through the use of a diode, it is used to clamp one grid of the multivibrator. This holds multivibrator 127 for the duration of the 292-micro-second pulse. At the end of the hold time the grid of multivibrator 127 is released and the matrix scan cycle repeats. An output is also taken from the hold time output cathode follower 125 for use in synchronizing external circuits.

Figures 2, 3, 4:
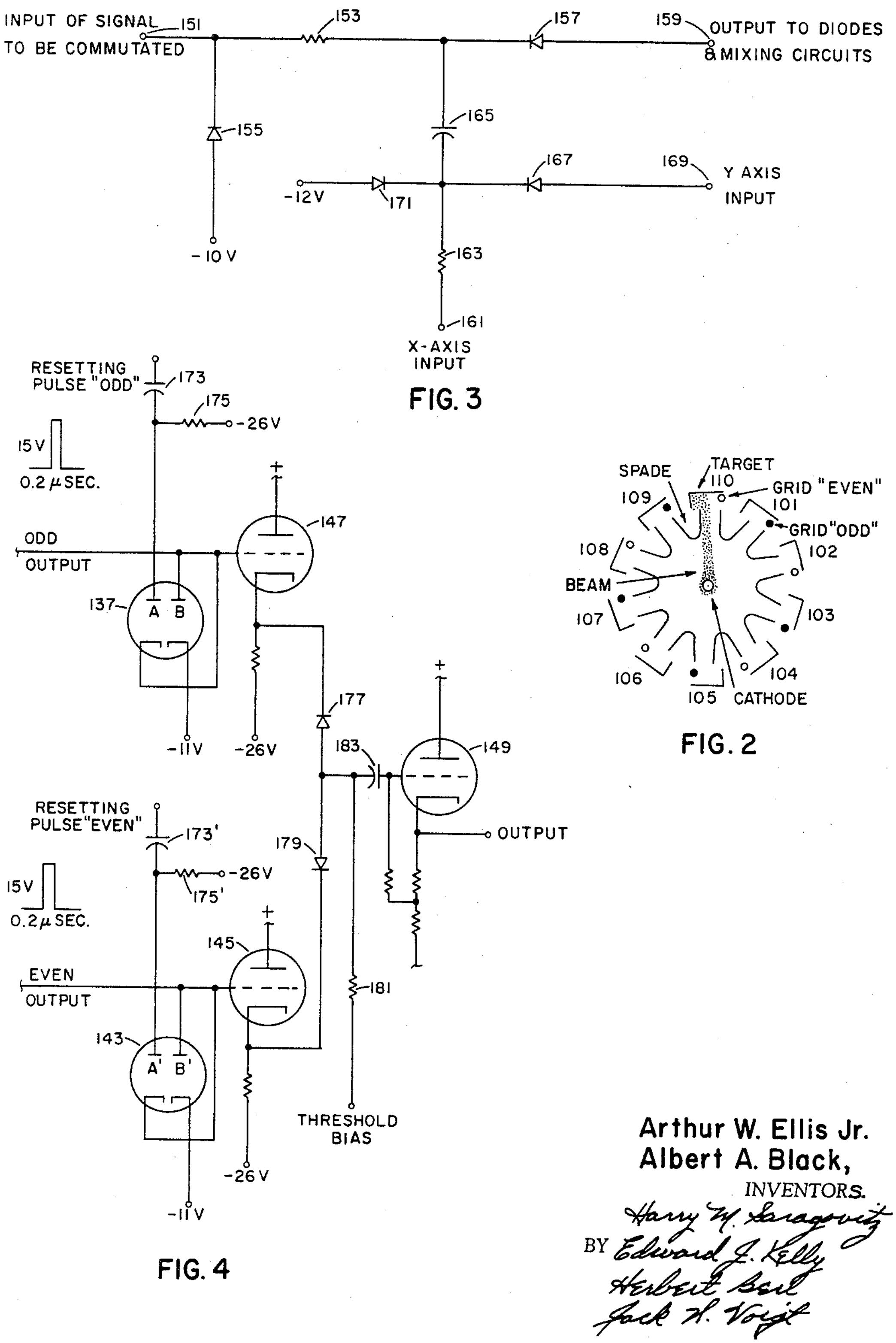
FIGURE 2 is a schematic diagram of a magnetron beam switch of FIGURE 1.
FIGURE 3 is a schematic diagram of one diode switch of the diode switching matrix of FIGURE 1.
FIGURE 4 is a schematic diagram of the output and resetting circuitry of FIGURE 1.

The diode switch matrix is composed of 100 switching circuits, a typical example of which is shown in FIGURE 3. The circuit has three inputs and one output. The signal to be commutated is connected to input terminal 151 which is connected to resistor 153. An input limiting diode 155 is connected between the input 151 and a −10 v. supply. An output switching diode 157 is connected in series with resistor 153 and to output terminal 159. An X-axis input is connected to terminal 161 which is connected to one end of resistor 163. The other end of resistor 163 is connected through capacitor 165 to the junction between resistor 153 and diode 157. A Y-axis switching diode 167 is connected between Y-axis input terminal 169 and the common connection of capacitor 165 and resistor 163. A pulse limiting diode 171 is connected between the same common connection and a −12 v. supply.

The X and Y axis input terminals of each switching circuit are connected to the X and Y axis tubes 115 and 117 as follows. Output terminal 101 of tube 115 is connected to the Y-axis input terminals of switches 1 thru 10. Terminals 102 thru 110 are connected to switches 11 thru 100 similarly as exemplified in FIGURE 1. Output terminal 201 of tube 117 is connected to the X-axis input of switches 1, 11, 21, 31, 41, 51, 61, 71, 81, and 91. Output terminals 202 thru 210 are connected to the remainder of the switches as shown in the drawing. All of the outputs of the odd numbered switchs are bussed together to an input of reset diode circuit 137 while all the outputs of the even numbered switches are bussed together to an input of reset diode circuit 143 with the exception of switch 100 whose output is connected as duscussed above.

The signal to be commutated is fed in through resistor 153. A gating pulse formed by coincidence of both X axis and Y axis inputs to terminals 161 and 169 respectively is coupled in through capacitor 165 (FIGURE 3). If the signal is constant or slowly varying the cathode of diode 157 will, in the absence of a gating pulse, be at a potential equal to that of the input. In the present system all input signals are negative and limited by diode 155 to a maximum amplitude of −10 volts. The anode of diode 157 is normally referenced to −11 volts by a resetting circuit to be described later. This combination of voltages assures that diode 157 can never conduct without a gating pulse.

Upon application of a gating pulse the cathode of diode 157 is driven more negative by an amount equal to the height of the pulse, in this case 12 volts. As the cathode of diode 157 begins to go negative with respect to −11 volts, diode 157 begins to conduct and the output goes negative from −11 volts to the sum of the signal level and the height of the gating pulse. If the signal present at the time of gating is −5 volts, the cathode of diode 157 will go to $-5+(-12)=-17$ volts. The output in turn will move from its reference level of −11 volts to −17 volts. The height of the output pulse can be seen to be a function of the input signal level as is desired. The circuit as shown will give a usable output all the way to 0 volts, since the gating pulse is still capable of turning on diode 157 at this level.

Were it not for stray capacitance effects on the output, the circuit would be usable as it is without the resetting feature. The effect of stray capacitance on the output is to prevent the output voltage from returning rapidly to its reference level after diode 157 is shut off.

Referring now to FIGURE 4 in conjunction with FIGURE 1 the matrix has two outputs, one odd and one even, each of which is alternately active and inactive. During the period when a particular channel is not being sampled, its respective resetting circuit is functioning. The resetting pulse, in this case 0.2 micro-second long and 15 volts high is coupled onto the plate of section A of dual diode tube 137 through capacitor 173 thus turning on both diodes and thereby momentarily shorting the output of the odd channel which is connected to plate B of tube 137 to the reference voltage (−11 volts) connected to the cathode of section B. This effectively discharges any stray capacitance and establishes a well defined reference prior to the next sampling operation. Plate A carries a bias of −26 volts connected thereto through resistor 175. The cathode of section A is connected to the common odd output channel. The requirement is that section A must never be turned on by a signal which in this system can carry the cathode of section A as far as −22 volts. Once the plate bias has been established on section A, the resetting pulse must be high enough to carry the plate up to the reference level. (−11 volts).

The timing of the resetting pulse in this system is 10 micro-seconds after the end of the sampling pulse. This 10 micro-second delay is introduced by means of monostable multivibrator 133 which has its input connected to the odd grid output of X axis multivibrator 127. The output of multivibrator 133 is connected to the input blocking oscillator 135 which generates the resetting pulse at the output connected to reset diode 137.

The even reset pulse is generated in the same manner by the even output of multivibrator 127 connected to delay multivibrator 139 which appiles a 10 micro-second pulse to oscillator 141 which generates the even resetting pulse applied to reset diode 143. Reset diode 143 functions the same as that discussed above for diode 137 and the identical parts are indicated by primes Following the resetting circuits the two outputs are direct coupled to a pair of cathode followers 147 and 145 and then mixed through a pair of diode mixers 177 and 179 resepctively. The plates of the mixing diodes are biased from a manually controlled threshold bias through resistor 181 which enables the rejection of noise signals below a desired level. At this point both odd and even channel outputs are coupled to a cathode follower output stage 149 through capacitor 183 which carries the total commutated output.

While the invention has been described with reference to a preferred embodiment thereof, it will be apparent that various modifications and other embodiments thereof will occur to those skilled in the art within the scope of the invention. Accordingly, we desire the scope of our invention to be limited only by the appended claims.

We claim:

1. An electronic commutator comprising: a plurality of switching means being numbered consecutively; said switching means each having an input for accepting signals to be commutated connected thereto; said switching means each having X and Y axis inputs; said X axis inputs being divided into a plurality of X axis groups; each of said X axis inputs of each of said X axis groups being connected in common; an X axis stepping means having a plurality of outputs connected to respective ones of said common connected X axis inputs of said switching means; said Y axis inputs being divided into a plurality of Y axis groups; each of said Y axis inputs of each of said Y axis groups being connected in common; a Y axis stepping means having a plurality of outputs connected to respective ones of said common connected Y axis inputs of said switching means; synchronizing means connected to the inputs of said stepping means for providing pulses to said stepping means causing the X axis stepping means to complete one stepping cycle for each step of said Y axis stepping means; each of said switching means having an output actuated by coincident inputs to said X and Y axis inputs; said outputs of "odd" numbered groups of said plurality of X axis groups being connected in common and providing essentially "odd" commutated output channels; said outputs of "even" numbered groups of said plurality of X axis groups being connected in common and providing essentially "even" commutated output channels; another switching means at the end of said X and Y axis groups, said another switching means being connected to X and Y axis stepping means in the same manner as said plurality of switching means, said another switching means having an output connected to said synchronizing means; an output means having a first and a second input connected respectively to said "odd" and "even" output channels; and said output means having a single output terminal for providing a sequentially commutated output of all of said input signals.

2. An electronic commutator as set forth in claim 1 wherein each of said stepping means comprise a magnetron beam stepping switch, and switch having a plurality of positions, each position having a target, a grid and a spade, said plurality of outputs of said stepping means being connected to said targets, and said targets being equal in number to said plurality of positions.

3. An eletcronic commutator as in claim 2 wherein said synchronizing means comprises a first and a second multivibrator having their outputs connected respectively to said X and Y axis stepping means predeterminately for providing pulses to said stepping means to step through its plurality of positions.

4. An electronic commutator as in claim 3 wherein said synchronizing means further comprises a differentiator negative clipper means connected between said second multivibrator and an output of said X axis stepping means, said output of said X axis stepping means being last in a stepping sequence whereby said Y axis stepping means is stepped one step for each complete stepping cycle of said X axis stepping means.

5. An electronic commutator as in claim 4 wherein said synchronizing means further comprises a differentiator positive clipper means, said connection from said another switching means to said synchronizing means being a connection to said differentiator positive clipper means of said synchronizing means.

6. An electronic commutator as in claim 5 wherein said synchronizing means further comprises a hold time means connected between said differentiator positive clipper means and said first multivibrator for stepping said first multivibrator for a predetermined length of time at the end of each complete cycle of commutation.

7. An electronic commutator as in claim 3 wherein said output means comprises: a first and a second reset means each having an output connected respectively to said "odd" and "even" output channels for applying a reset pulse to said channels during the time that said channel is not conducting; a first and second amplifier means having inputs connected respectively to said "odd" and "even" output channels; a third amplifier means having a single input; and a diode mixer means connecting an output of each of said first and second amplifier means to said single input of said third amplifier means whereby the total commutated output of all of said input signals is presented at said output of said third amplifier means.

8. An electronic commutator as set forth in claim 1 wherein, each of said switching means comprises: a first diode connected between said signal input and a first negative voltage source, said signal input being connected through a first resistor connected in series with a diode to said output; a capacitor having a first lead connected to said second diode at said connection to said first resistor, said capacitor having a second lead connected through a second resistor to said X axis input; a third diode connected between said Y axis input and said second lead of said capacitor; and a fourth diode connected between a second negative voltage source and said second lead of said capacitor whereby when said stepping means applies pulse at the same time to said X and Y axis inputs said second diode is gated on allowing a signal applied to said signal input to be passed on to said output.

9. An electronic commutator as set forth in claim 2 further comprising a beam forming relay means connected to said spade of a first position of each of said stepping means for forming an electron beam between said target of said first position and a cathode common to all of said positions.

10. An electronic commutator as set forth in claim 7 where in each of said reset means comprises an oscillator means for generating a reset pulse, said reset pulse being applied to said output channel through a reset diode means, said oscillator being triggered by a delay means having an output connected to an input of said oscillator means, and said delay means having an input connected to one of said outputs of said first multivibrator.

References Cited

UNITED STATES PATENTS

| | | | |
|---|---|---|---|
| 2,931,014 | 3/1960 | Buchholz et al. | 328—103 X |
| 3,165,702 | 1/1965 | Grijseels et al. | 328—75 |

RODNEY D. BENNETT, *Primary Examiner.*

C. E. WANDS, *Assistant Examiner.*